(12) United States Patent
Mukasyan et al.

(10) Patent No.: US 7,964,172 B2
(45) Date of Patent: Jun. 21, 2011

(54) METHOD OF MANUFACTURING HIGH-SURFACE-AREA SILICON

(76) Inventors: Alexander Mukasyan, Granger, IN (US); Vasiliy Mukasyan, Chernogolovka (RU); Mikael Nersesyan, St. Louis, MO (US)

( * ) Notice: Subject to any disclaimer, the term of this patent is extended or adjusted under 35 U.S.C. 154(b) by 109 days.

(21) Appl. No.: 12/587,738

(22) Filed: Oct. 13, 2009

(65) Prior Publication Data

US 2011/0085960 A1    Apr. 14, 2011

(51) Int. Cl.
*C01B 33/023* (2006.01)
(52) U.S. Cl. .......... 423/350; 423/348; 423/349; 75/343; 977/775
(58) Field of Classification Search ........... 423/348–350
See application file for complete search history.

(56) References Cited

U.S. PATENT DOCUMENTS

| | | | |
|---|---|---|---|
| 4,529,576 A * | 7/1985 | Sancier | 423/350 |
| 4,751,067 A | 6/1988 | Levin | |
| 6,007,869 A | 12/1999 | Schreieder et al. | |
| 2008/0054106 A1 | 3/2008 | Zehavi et al. | |
| 2009/0010833 A1 * | 1/2009 | Rosenband et al. | 423/349 |
| 2009/0092899 A1 | 4/2009 | Treger | |

FOREIGN PATENT DOCUMENTS

| | | |
|---|---|---|
| JP | 2008037735 | 2/2008 |
| RU | 2327639 | 6/2008 |
| WO | WO 2006/041271 | 4/2006 |
| WO | WO2007116326 | 10/2007 |
| WO | WO2008/067391 * | 6/2008 |

OTHER PUBLICATIONS

*Pyrotechnics: VI.* "Silicon—An Old Fuel with New Perspectives," Fischbachstr. 16, D-90552, Rothenbach and Pegnitz, Germany.
N. V. Nemchinova, et al, "Physical and Chemical Simulation of Carbothermal Production of High-Purity Silicon," *Contemporary Problems of Science and Education*, Irkutsk State Technical University, Siberian Academy of Sciences, Russia.
"Silicon and solar-grade silicon production by solar dissociation of $Si_3N_4$,", *Solar Energy*, 80(10), (2006) 1349-1354.The attractive "green", Murray, J.P., Flamant, G., and Roos, C.J.
*Journal of Material Research*, Aug. 1995, pp. 2073 to 2084, N. Rao, et al.

* cited by examiner

*Primary Examiner* — Stanley Silverman
*Assistant Examiner* — Diana J Liao (57) ABSTRACT

A method for synthesis of high surface-area (>100 m²/g) and nanosized (≦100 nm) silicon powder by initiation of self-sustained combustion reaction in a mixture of silicon dioxide and magnesium powders in a sealed reactor chamber under pressurized inert gas atmosphere. A specific feature of the method is rapid cooling of the product at a rate of 100 K/s to 400 K/s in the area directly behind the combustion front.

15 Claims, 4 Drawing Sheets

METHOD OF MANUFACTURING HIGH-SURFACE-AREA SILICON

BACKGROUND OF THE INVENTION

1. Field of the Invention

The present invention relates to synthesis of materials using combustion in powder metallurgy and, more specifically, to reduction-type combustion synthesis (RCS) of pure high-surface-area silicon (Si) used in electronics, solar energy systems, high-energy density materials, etc.

2. Description of the Prior Art

With the development of advanced technologies such as electronics and solar energy, pure silicon becomes an important material for the industry, and the demand for this product is constantly growing. On the industrial scale, reducing silicon dioxide with carbon in high-temperature furnaces typically produces pure silicon (see *Special Materials in Pyrotechnics: VI.* "Silicon—An Old Fuel with New Perspectives," Fischbachstr. 16, D-90552, Rothenbach and Pegnitz, Germany). Current investigations on improving this process are described by N. V. Nemchinova, et al, in "Physical and Chemical Simulation of Carbothermal Production of High-Purity Silicon," *Contemporary Problems of Science and Education*, Irkutsk State Technical University, Siberian Academy of Sciences, Russia. However, this conventional method is energy consuming and requires a relatively long process (days). Furthermore, the final product normally requires additional purification. Moreover, in some processes the by-product of this technology is carbon dioxide, which is responsible for the undesired greenhouse effect.

The attractive "green" approach to silicon and silicon-nitride production for use in solar cells is suggested by Murray, J. P., Flamant, G., and Roos, C. J. in "Silicon and solar-grade silicon production by solar dissociation of $Si_3N_4$," *Solar Energy*, 80(10), (2006) 1349-1354. In order to shorten the long and energy-intensive high-temperature purification process, the authors proposed a two-step process to produce silicon from silica: first, a carbothermal reduction is carried out in the presence of nitrogen to yield silicon nitride, and then the nitride is dissociated in order to yield silicon. The last step could be combined with purification of the silicon if the solar-grade silicon is the desired end product. Experimental results indicated that silicon nitride is dissociated to yield silicon with no detectable nitride content.

Two other similar methods of silicon production, i.e., an aluminothermy and magnesium reduction, are also well known. Zhihao Bao, et al, in *Nature* 446, 172-175 (8 Mar. 2007) describes chemical reduction of three-dimensional silica microassemblies into microporous silicon replicas. The authors demonstrated a low-temperature (650° C.) magnesiothermic reduction process for converting three-dimensional nanostructured silica microassemblies into microporous nanocrystalline silicon replicas. The intricate nanostructured silica microshells (frustules) of diatoms (unicellular algae) were converted into co-continuous nanocrystalline mixtures of silicon and magnesia by reaction with magnesium gas. Selective magnesia dissolution then yielded an interconnected network of silicon nanocrystals that retained the starting three-dimensional frustule morphology. The silicon replicas possessed a high specific surface area (>500 $m^2$ $g^{-1}$), and contained a significant population of micropores (0.20 Å). This process enables syntheses of microporous nanocrystalline silicon microassemblies for use in sensors, electronics, and optical as well as other applications.

However, the aluminothermic reaction results in the formation of aluminum oxide, which is a hard-to-separate phase, and the process of silicon purification is abnormally difficult and expensive. The magnesium-reduction method is more attractive because, contrary to $Al_2O_3$, an undesirable phase, i.e., MgO, can be easily leached from the as-synthesized product. However, this method is still energy consuming and is difficult for production of submicron powders.

Known in the art is the synthesis of fine and pure silicon based on chemical deposition from the gaseous or liquid phase. For example, U.S. Pat. No. 4,751,067 issued in 1988 to H. Levin discloses a process for making silicon from halosilanes and halosilicons. The process is carried out in a reactor adapted for continuously producing molten, solar-grade purity elemental silicon by thermal reaction of a suitable precursor gas, such as silane ($SiH_4$). The reactor includes an elongated reactor body having graphite or carbon walls that are heated to a temperature exceeding the melting temperature of silicon. The precursor gas enters the reactor body through an efficiently cooled inlet tube assembly and a relatively thin carbon or graphite septum. The septum, being in contact on one side with the cooled inlet and the heated interior of the reactor on the other side, provides a sharp temperature gradient for the precursor gas entering the reactor and renders the operation of the inlet tube assembly substantially free of clogging. The precursor gas flows in the reactor in a smooth and substantially axial manner. Liquid silicon formed in the initial stages of thermal reaction reacts with the graphite or carbon walls to provide a silicon carbide coating on the walls. The silicon-carbide-coated reactor is highly adapted for prolonged use for production of highly pure solar-grade silicon. Liquid silicon produced in the reactor may be used directly in Czochralski equipment or in other crystal-shaping equipment.

For the purpose of illustration, some methods, compositions, and apparatuses for manufacturing silicon powders known in the industry are described in the patent publications given below.

U.S. Pat. No. 6,007,869 issued in 1999 to F. Schreieder, et al, discloses a process for preparing silicon granules with chlorine contamination below 50 ppm by weight by deposition of elemental silicon on silicon particles in a fluidized-bed reactor. This reaction has a heating zone below a reaction zone. The silicon particles are fluidized in the heating zone by means of an inert silicon-free carrier gas to produce a fluidized bed and are heated by means of microwave energy. The silicon particles are reacted within the reaction zone where a reaction gas comprises a silicon source gas and the carrier gas. The average temperature of the reaction gas in the reaction zone, while the gas is perfusing the fluidized silicon particles, is maintained at less than 900° C. The average temperature of fluidized silicon particles in the reaction zone, while they are being perfused by the reaction gas, is maintained at greater than 900° C.

Russian Patent No. 2327639 issued in 2008 to Yu. Kolmogorov, et al, refers to obtaining highly pure silicon that can be used in the production of solar elements. Pure silicon dioxide is melted at a temperature of 1900° C., and a mixture of powders of pure silicon and silicon dioxide taken at a stoichiometric ratio is introduced into the melt. The resulting gaseous silicon monoxide is then reduced in a gaseous phase with pure methane at a temperature of 2300 to 2500° C., and elementary silicon is produced. The invention allows upgrade of silicon purity and reduces production cost.

International Patent Application Publication No. 2006/041271 published in 2006 (inventors: N. Bekturganov, et al) discloses a method for production of pure silicon by aluminothermic reduction of silicon dioxide in silicon-containing phosphorous slag for solar cell manufacture. The solar slag is loaded into an open graphite crucible and is then heated in an induction furnace at the eutectic melting temperature, whereupon it is mixed with aluminum. The obtained silicon separated from the slag emerges on the slag's surface and is loaded with the new portion of slag and aluminum. The process is repeated several times until full sedimentation of the reacted slag and its separation from the silicon, which appeared in the top part of the reactor. The obtained silicon is crushed and sorted. The process allows silicon powder total purity of 99.99.

Japanese Unexamined Patent Application Publication No. JP2008037735 published in 2008 (inventor: T. Shimamune) discloses a method for manufacturing high-purity silicon that is pure enough to be used in a solar battery. The silicon is obtained by reducing silicon tetrachloride with zinc gas. In the manufacturing method, the zinc gas or a zinc-containing gas essentially comprising zinc gas is constantly sent to a reactor to induce a zinc-gas atmosphere therein, silicon tetrachloride in a liquid state is introduced to the reactor, a zinc reduction reaction is induced to produce silicon, and only a reaction-product gas is discharged from the reactor at the reactor terminal so that the produced silicon is locally accumulated inside the reactor. The produced silicon is locally accumulated inside the reactor in a silicon-melt-retaining tank, which is kept at a temperature equal to or higher than the melting point of the silicon.

International Patent Publication No. WO2007116326 published in 2007 (Inventors: T. Kaufman, et al) discloses recovery of silica from aluminosilicate-containing material and the production of solar and/or electronic grade silicon therefrom. In particular, the process for manufacturing silicon comprises subjecting highly pure and particulate silica in amorphous form to an in-flight plasma carbothermic reduction in a plasma reactor consisting of a plasma torch and a vessel suitable for plasma-associated chemical reaction of silica and collection of liquid silicon. The highly pure and particulate silica is preferably produced using a process for manufacturing silica and/or alumina from an aluminosilicate-containing material comprising mixing the material with a metal chloride, preferably calcium chloride, being in the form of a solution or slurry, subjecting the wet mixture to a granulation step, burning the granules at a temperature of 900 to 1300° C., leaching the obtained heated mixture with hydrochloric acid to obtain a salt solution and insoluble silica, separating insoluble silica from the salt solution, and recovering dry silica. Alumina may be produced by crystallizing AlC13 from the salt solution and heating the $AlC_{13}*6H_2O$ crystals to produce alumina.

In the *Journal of Material Research*, August 1995, pp. 2073 to 2084, N. Rao, et al, describe synthesis of nanophase silicon, carbon, and silicon carbide powders using a plasma expansion process. Nanophase powders of Si, C, and SiC with narrow size distributions are synthesized by dissociating reactants in DC arc plasma and quenching hot gases in a subsonic nozzle expansion. The plasma is characterized by calorimetric energy balances, and the powders by on-line aerosol measurement techniques and conventional materials analysis. The measured nozzle quench rate is approximately $5 \times 10^6$ K/s. The generated particles have numerical mean diameters of approximately 10 nm or less, with Si forming relatively dense and coalesced particles, while SiC forms highly aggregated particles. According to the authors, SiC particle formation is initiated by nucleation of small silicon particles.

U.S. Patent Application Publication No. 20080054106 published in 2008 (inventors: R. Zehavi, et al) discloses a method of jet milling silicon powder of high purity in which silicon pellets are fed into a jet mill producing a gas vortex in which the pellets are entrained and pulverized by collisions with each other or walls of the milling chamber. The average particle size can be controlled by varying gas feed pressure, flow rates for feed and mill gases, position of the vortex finder, size of silicon pellets, and feed rate of pellets into the mill. With this method, it was possible to achieve a narrow size distribution of 0.2 to 20 microns.

U.S. Patent Application Publication No. 20090092899 published in 2009 (inventor: J. Treger) discloses a method that includes combining fumed silicon oxide with a metal to form silicon having an average particle size of less than approximately 100 nm. Such silicon can be incorporated into an anode of a lithium ion cell.

However, none of the above-mentioned methods or devices allows for effective production of high-surface area (>100 $m^2/g$) Si powders with small amounts of impurities (<0.1 wt. %) and with particles at the submicron size of (50 to 200 nm). Thus, a need exists for an improved method and apparatus for producing a submicron silicon powder.

SUMMARY OF THE INVENTION

It is an object of this invention to provide an efficient and flexible method for production of high-surface-area nanosized powders of high-purity silicon. It is another object to provide an apparatus for manufacturing a nanosized silicon powder of high purity and high surface area. A still further object is to provide a method for synthesis of high-surface-area nanosized silicon powder of high purity by using exothermic heat, thus reducing the amount of external energy during the manufacturing process. It is a further object to provide a method for synthesizing high-surface (>100 $m^2/g$) finely powdered silicon with nanosized ($\leq$100 nm) particles.

The method of the invention is intended for the production of pure high-surface-area nanosized powders of silicon by reduction-type combustion synthesis. The method consists of the following steps: (1) preparing a homogeneous reactant green mixture; (2) loading the reaction mixture into the reactor; (3) filling the reactor with an inert gas and providing optimum inert gas pressure inside the reactor; (4) providing initial local heating of the powder mixture and initiating a combustion reaction; (5) causing self-propagation of the reaction under the effect of exothermic heat from the reaction; (6) providing optimal cooling conditions for the combustion product; and (7) carrying out post-synthesis treatment of the product, which involves leaching and short-term milling.

Preparation of a homogeneous reactant green mixture (Step 1) is similar to preparation commonly carried out in powder metallurgy. In this step, silicon dioxide ($SiO_2$) and magnesium (Mg), the reactant powder components, is dried under vacuum at approximately 40 to 100° C., weighed into appropriate amounts, and thoroughly mixed for obtaining a homogeneous reaction medium, i.e., a green mixture.

Step 2 consists of loading the reaction mixture prepared in Step 1 into a sealable reaction chamber of the apparatus. On completion, the reaction chamber is sealed. The reaction chamber can be made from stainless steel, or another corrosion resistant material, and can have a length of 2 meters and an inner diameter of approximately 320 mm. The reaction chamber can be lined with a graphite brick to protect the reactor walls from interaction with reagents and can be provided with a water-cooling jacket. The reaction chamber is further provided with an igniter device, e.g., in the form of tungsten wire, for local mixture preheating and initiation of the reaction.

In Step 3 the reaction chamber is evacuated and purged with inert gas for several times and is then filled with inert gas (e.g., argon) to optimum initial pressure in the range 10 to 15 atm.

In Step 4 the powder mixture is subjected to initial local heating in order to initiate a reaction. This stage can be carried out by loading the reaction mixture into a graphite tube that has an inner diameter, e.g., of approximately 300 mm. The tube may then be constrained in a specially designed fixture in the reaction chamber. After the igniter locally heats the powder, a combustion reaction is initiated locally. To initiate the subsequent self-sustained combustion mode (Step 5), only a small volume, e.g., approximately 1 mm$^3$, of a mixture loaded into the system of the present invention can be preheated locally to a temperature equal to the melting point of Mg (922 K). The overall combustion reaction for stoichiometric composition (Mg:SiO$_2$=2:1) can be written as follows: $SiO_2+2Mg=Si+2MgO$. Thus, the final product involves both silicon and magnesium oxide phases.

Post-synthesis treatment (Step 7) includes chemical leaching of the synthesized product in order to completely eliminate the MgO phase. More specifically, at this stage the combustion product is treated with 36% hydrochloric acid under normal conditions without any additional heating for 3 hours. The amount of the acid depends on the amount of magnesium oxide in a reagent ratio of 1/1. The sample then is dried under normal conditions for approximately 1 hour. The product is milled and classified to obtain the desired silicon powder.

DETAILED DESCRIPTION OF THE PREFERRED EMBODIMENT

Prior to describing the invention, it is advantageous to define terminology used herein, as follows.

| Term | Description |
| --- | --- |
| Arrested reduction-type combustion synthesis | Synthesis using metal-I (or nonmetal) oxide and reducing metal-II to produce metal-I (or nonmetal) through combustion reaction, after which the product is quenched (cooled) at an appropriate rate |
| High-surface-area powder | Specific surface area exceeding 100 m$^2$/g |
| Nanopowder | Particle size less than or equal to 100 nm |
| Green mixture | Initial untreated mixture of reactant powders |
| Inert gas | Noble gas such as helium, neon, argon, krypton, xenon, as well as any gas that is nonreactive under the conditions in which the method of the present invention is carried out with materials that react with each other to form a particular compound |
| Ambient gas pressure | Initial gas pressure contained in a reaction chamber around a reaction-media sample |
| Locally initiated reaction | Reaction initiated in a discrete location (approximately a volume of 1 mm$^3$) on or within a sample, such that the reaction becomes self-propagating and self-sustainable within, on, and along the sample |

As soon as the reaction is initiated, the power is turned off, and the reaction self-propagates (Step 5) through the reaction mixture under the effect of exothermic heat released after initiation of the reaction.

A specific aspect of the present invention is optimum cooling (Step 6) of the combustion product at a rate that makes it possible to synthesize nanosized ($\leq$100 nm) particles of silicon having high surface area (>100 m$^2$/g). Experiments show that the cooling rate can range from 100 K/s to 400 K/s and that the most optimal cooling rate for this stage is 100 to 200 K/s. Lower cooling rates lead to a lower specific surface area of produced silicon. On the other hand, higher cooling rates lead to reaction quenching and not full conversion of SiO$_2$ to Si in the combustion front.

As described below, the method of the invention (hereinafter referred to as arrested reduction-type combustion synthesis) makes it possible to obtain a pure high-surface-area silicon powder that has a specific microstructure and is synthesized in a unique way.

The method consists of the following steps: (1) preparing a homogeneous reactant green mixture; (2) loading the reaction mixture into the reactor; (3) filling the reactor with an inert gas and providing optimum inert gas pressure inside the reactor; (4) providing local preheating of the reaction media in order to initiate a reaction; (5) causing self-propagation of the reaction under the effect of exothermic heat of the reaction; (6) providing optimal cooling conditions for the combustion product; and (7) carrying out post-synthesis treatment of the product, which involves leaching and short-term milling.

Figure 1:
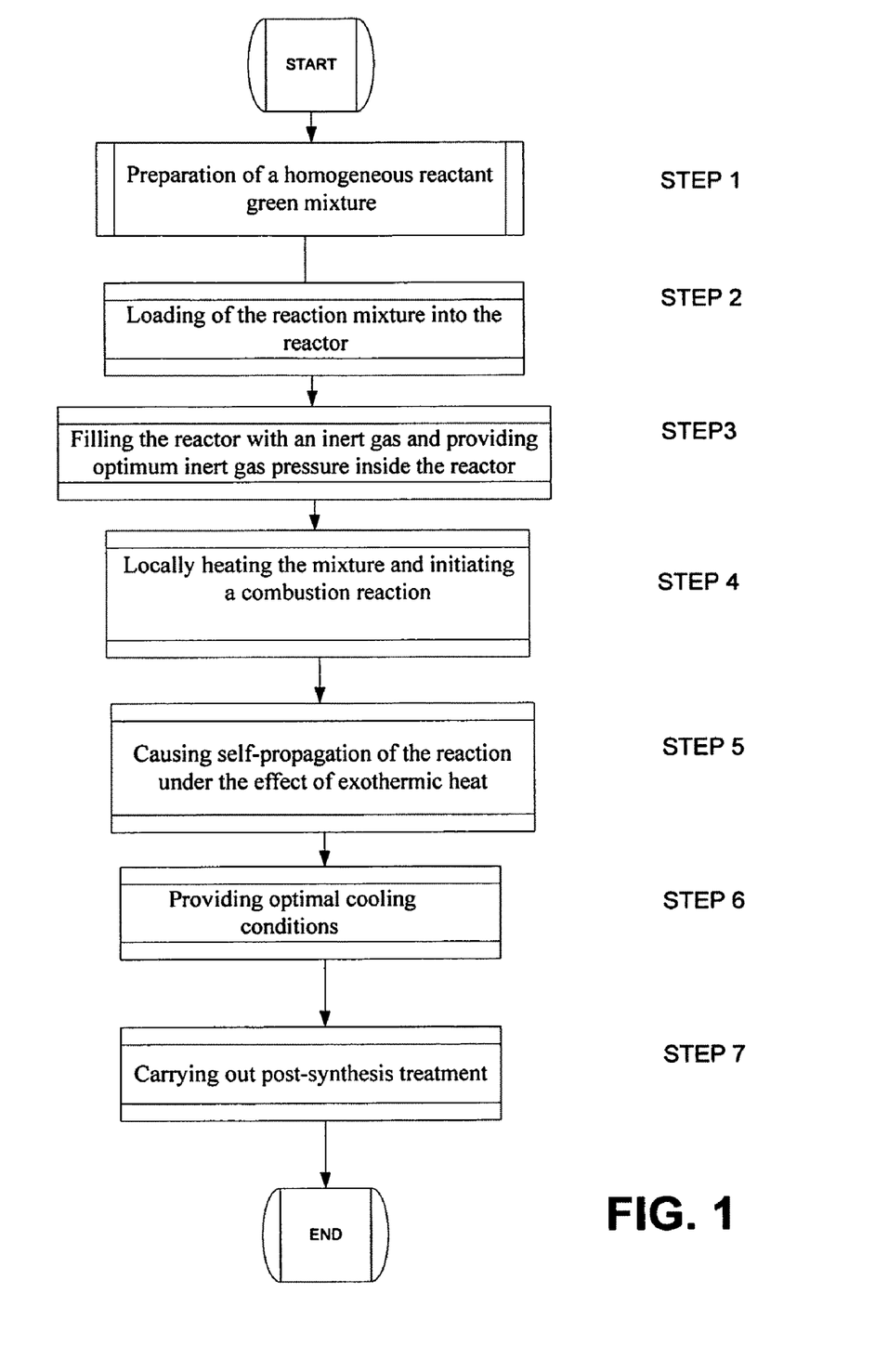
FIG. 1 is a flowchart of the process of the invention for manufacturing a high-surface-area nanosized silicon powder.

A flowchart of the method of the invention is shown in FIG. 1. Preparation of a homogeneous reactant green mixture (Step 1) is similar to the preparation commonly carried out in powder metallurgy. In this step, a reactant mixture is prepared from the powders of the components, which in the method of the invention comprise silicon oxide ($SiO_2$) and magnesium (Mg).

Prior to mixing, the components are dried under vacuum at approximately 40 to 100° C. and then dosed by weighing to appropriate amounts. For example, according to the invention, in order to produce 1 kg of final silicon powder, one needs approximately 2150 g of $SiO_2$ powder having particles size from 1 to 100 µm, and approximately 870 g of Mg particles ranging in size from 50 to 200 µm. This stage also includes thorough mixing of the components to obtain a homogeneous reactant mixture, which is known as a green mixture. At this stage it is important to minimize local fluctuations from given concentrations of components because such deviations may influence the final average size of the particles and dispersion of their dimensions. Mixing can be carried out by using standard mixing equipment such as a Ross mixer, Bunbury mixer, Hobart mixer, homogenizing mixer, ball mixer, roller mixer, ball mill, etc. In other words, mixing equipment must provide a mixture of a high degree of homogeneity.

Figure 2:
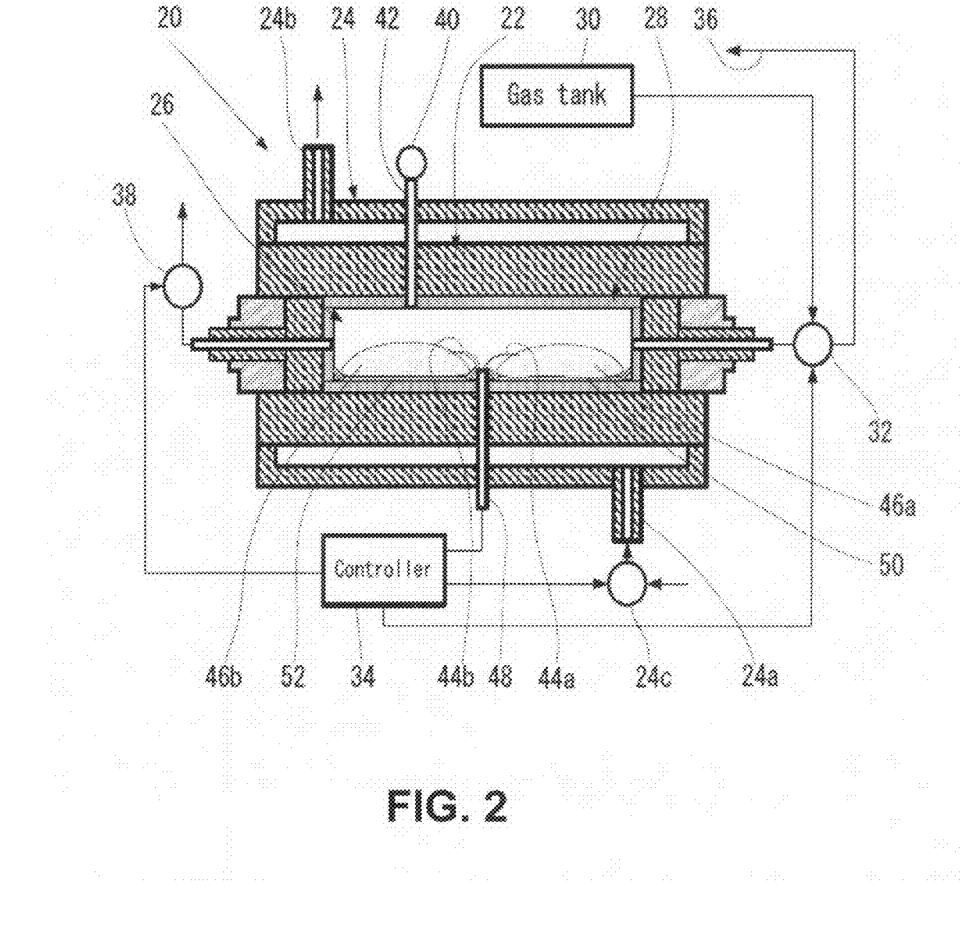
FIG. 2 is a schematic longitudinal view of an apparatus suitable for realization of the method of the invention, the green mixture being shown in the form of a bulk material.

In Step 2 the green mixture is loaded into the reactor. A schematic view of the apparatus suitable for carrying out the method of the invention is shown in FIG. 2, which is a longitudinal sectional view. The apparatus as a whole is designated by reference numeral 20 and consists of a housing 22 surrounded by a water-cooling jacket 24 to cool the apparatus during the reaction and to cool the product on completion of the reaction. In FIG. 2, reference numeral 24a designates a cooling water inlet pipe, which is connected to a water-supply source (not shown) through a valve 24c controlled by a controller 34.

The housing can be made from stainless steel or a similar chemically resistant material. A sealable reaction chamber 26 of the apparatus may have a round cross section and may have a length of approximately 2 m and a diameter of approximately 320 mm. The inner walls of the reaction chamber 26 are lined with a refractory material such as a graphite brick lining 28. The reaction chamber is connected to a gas pressure source 30 (e.g., a gas tank) through a valve 32 controlled by the controller 34. The pipeline 36 is intended to evacuate gas from the reaction chamber through the valve 32. Gaseous waste is removed from the reaction chamber through a valve 38 that also is controlled by the controller 34. If necessary, the same valve 38 can be used to decrease pressure in the reaction chamber 26.

Since the reaction is carried out under high pressure up to 20 atm, the apparatus is equipped with a manometer 40, which is connected with the interior of the reaction chamber by means of a feed-through pipe 42 for controlling pressure in the reaction chamber 26.

Since initiation of the reaction requires only localized heating of a small volume of homogeneous reactant mixture (about 1 mm³), the apparatus does not have an external general heater for heating the entire volume of the reaction chamber 26 and rather is provided with at least one igniter in the form of a tungsten wire or wires 44a and 44b that can be inserted into the portions 46a and 46b of the bulk green powder mass. Reference numeral 48 designates an electrical feed through to guide lead wires to the tungsten-wire igniters 44a and 44b. It should be noted that since the apparatus works under high pressure and high temperature, all feed through and input/output pipelines of the reaction chamber 26 should be reliably sealed. The working chamber 26 may be equipped with mixture holders 50 and 52 for supporting the homogeneous reactant mixture in the working chamber 26. The mixture holders 50 and 52 are made from heat-resistant material such as molybdenum, or the like.

The dried homogeneous reactant mixture consists of silicon oxide and magnesium. In order to produce 1 kg of the final silicon powder, one needs approximately 2150 g $SiO_2$, and approximately 870 g of Mg. To obtain a large amount of the final product, content of the components is proportionally increased.

Prior to initiation of the reaction, the reaction chamber 26 (FIG. 2) is filled with an appropriate amount of the aforementioned homogeneous reactant mixture (Step 2).

The tungsten wires 44a and 44b are positioned approximately 5 mm inside reaction mixture portions 50 and 52. The chamber is then sealed, evacuated, and purged with inert gas, e.g., argon, for approximately three cycles and then filled with working inert gas to a desired pressure (Step 3).

According to a preferred embodiment of the present invention, a reaction chamber can be evacuated to a pressure between 0.0001 atm to 0.05 atm, preferably to 0.001 atm. The chamber is then filled with inert gas, such as argon, to a pressure between 10 atm to 20 atm, preferably to 15 atm.

According to one more aspects of the present invention, inert gas pressure (P) in the reactor before reaction initiation may be within the following range: 10<P<20 atm. Optimal pressure depends on several factors, including the amount of magnesium in the mixture. Too low pressure leads to evaporation of magnesium and incomplete reaction, while higher pressure provides more effective use of the materials.

Following this, a small initial volume (about 1 mm³) of the homogeneous reactant mixture is heated by means of the tungsten-wire igniters 44a and 44b until the reaction is initiated locally (Step 4), followed by shutdown of power, while the reaction front self-propagates along the mixture portions 50 and 52 (Step 5) under the effect of exothermic heat generated in the reaction.

Initial heating may be conducted until local preheating of the reaction mixture reaches the melting point of magnesium, which is 922 K.

After preheating, the tungsten-wire igniters 44a and 44b can be immediately turned off to allow the reaction front to propagate along the reaction mixture. Duration of preheating is generally relatively short, e.g., within 1 to 10 seconds, preferably approximately 5 seconds.

A specific aspect of the present invention is that by providing an optimum cooling rate (Step 6) for the product in the area just behind the combustion front, it becomes possible to synthesize silicon nanosized particles having dimensions equal to or less than 100 nm and a high surface area that is equal to or greater than 100 m²/g.

Experiments show that the optimal range of cooling rates is 100 to 200 K/s. Lower cooling rates lead to a lower specific surface area of the produced silicon. On the other hand, higher cooling rates lead to reaction quenching and not full conversion of silicon oxide to silicon in the combustion front The seventh step is a post-synthesis treatment of the as-synthesized products, which includes it chemical leaching for complete elimination of the MgO phase. Leaching is carried out with the use of 36% hydrochloric acid under normal conditions (i.e., atmospheric pressure and room temperature) for about 3 hours. The acid is used in an amount that depends on the amount of magnesium oxide in a reagent ratio 1/1. For example, approximately 3 liters of leaching solutions are required to produce 1 kg of Si from a stoichiometric mixture of $SiO_2$ and Mg. The leached product is then dried under normal conditions for about 1 hour. The product is then milled and classified to obtain silicon particles having a desired narrow particle-size distribution.

Figure 3A:
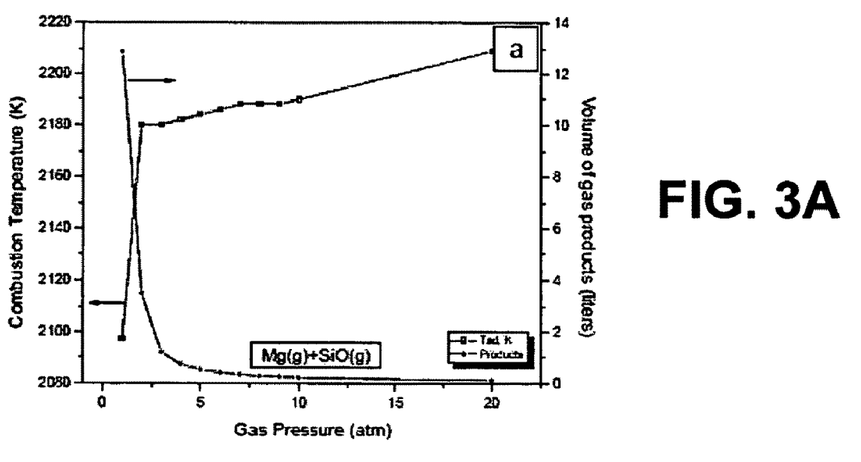
FIG. 3A is a graph that shows selection of optimum gas pressure in the reactor with reference to combustion temperature and volume of gaseous products.
Figure 3B:
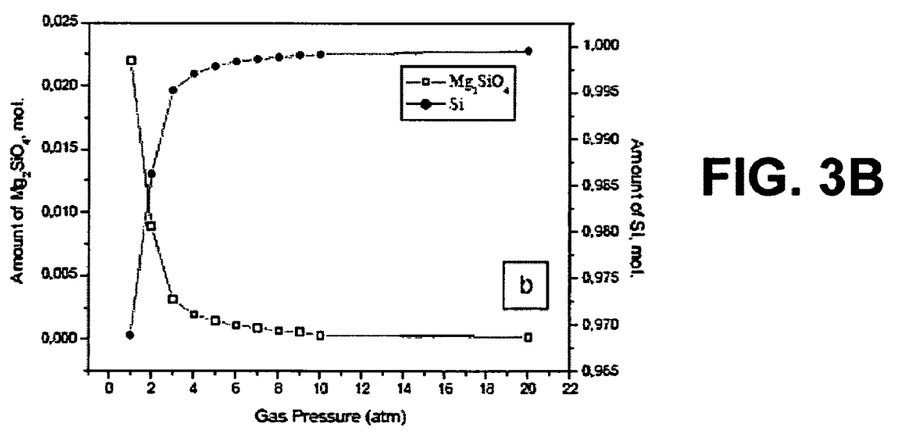
FIG. 3B is a graph that shows selection of optimum gas pressure in the reactor with reference to amounts of mixture components.

Thermodynamic calculation (FIGS. 3A and 3B) for a stoichiometric silicon oxide-magnesium system shows that the adiabatic reaction temperature (i.e., the maximum temperature that can be reached in the combustion process) is 2200K, which is much higher than the boiling point of magnesium (922 K). At such a temperature, the molten metal will evaporate, and the reaction will be incomplete. The use of higher inert (e.g., argon) gas pressure inside the reaction chamber leads to a decrease in or elimination of Mg evaporation, allowing full-reaction completion in the combustion wave. It was shown that inert gas pressure should range from 10 to 20 atm and its optimum value depends on several factors, including the amount of magnesium in the mixture. If the pressure is below the recommended lower limit (P<10 atm), then the magnesium will evaporate, and the reaction will be incomplete. If, on the other hand, the pressure of inert gas in the reactor exceeds the recommended upper limit (P>20 atm), this will lead to ineffective use of materials. Experiments conducted with a conventional 1:1 mixture ratio of silicon oxide to magnesium under vacuum and at atmospheric pressure confirmed the above conclusion.

Figure 4A:
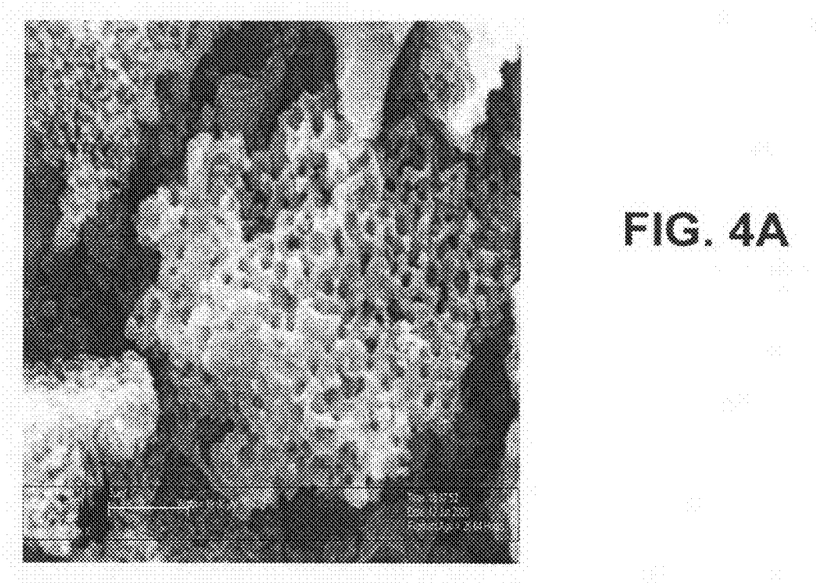
FIGS. 4A and 4B are microphotographs that illustrate the structure of obtained Si powder.
Figure 4B:
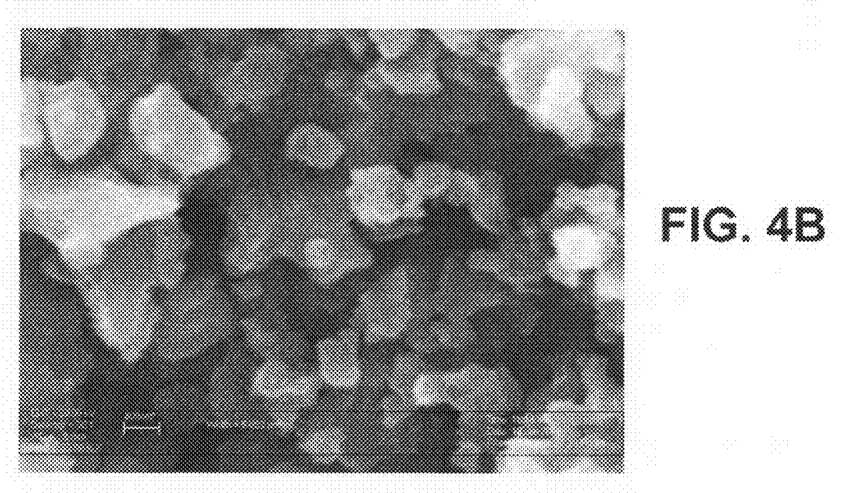

Another aspect of the present invention is that providing the optimal cooling rate for the product just behind the combustion front makes it possible to synthesize high-surface-area (>100 $m^2/g$) silicon with nanosized ($\leq$100 nm) particles. Experiments show that for the process of the invention, the optimal range of cooling rates is 100 to 200 K/s. If the cooling rate is below 100 K/s, this will lower the specific surface area of the produced silicon. On the other hand, if the cooling rate exceeds the recommended upper limit, this will lead to reaction quenching and to incomplete conversion of $SiO_2$ to silicon in the combustion front. Characteristic microstructures of Si powders synthesized under various cooling conditions are shown in FIGS. 4A and 4B. The specific high surface area (BET; 120 $m^2$/) nanosized (average size 80 nm) silicon with a narrow size distribution was synthesized at a cooling rate of 180 K/s (FIG. 4A), while powders with BET of only 5 $m^2/g$ and particles having the size of 500 nm were formed under the cooling rate of 50 K/s. Table 1 gives examples for characteristics of silicon powders that were synthesized under various conditions.

TABLE 1

Characteristics of Silicon Powders Synthesized under Various Conditions

| Example | | Inert gas pressure (atm) | Cooling rate (K/s) | Amount of $SiO_2$ in final product (wt. %) | Silicon, BET ($m^2/g$) | Average particle size of product (nm) |
|---|---|---|---|---|---|---|
| Comparative Examples | 1 | $10^{-3}$ | 50 | 10 | 2 | 1000 |
| | 2 | 1 | 50 | 5 | 4 | 800 |
| | 3 | 5 | 50 | 1 | 5 | 500 |
| | 4 | 10 | 50 | trace | 5 | 500 |
| | 5 | 15 | 50 | — | 5 | 500 |
| | 6 | 20 | 50 | — | 10 | 300 |
| Present Invention | 1 | 15 | 100 | — | 50 | 100 |
| | 2 | 15 | 180 | — | 120 | 80 |
| | 3 | 15 | 200 | — | 145 | 50 |
| | 4 | 15 | 400 | 10 | 200 | 30 |

Thus, it has been shown that the invention provides an efficient and flexible method for production of high-surface-area nanosized silicon powders. The invention provides a method for synthesizing high-surface-area nanosized silicon powders by using exothermic heat and thus reducing the amount of external energy during the manufacturing process.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, an igniter other than tungsten wire, e.g., a laser-type igniter, can be used to initiate the localized reaction. Inert gas other than argon can be used as a working inert gas in which Si powder can be synthesized. The structure of the apparatus can vary from the one shown in the drawings.

The invention claimed is:

1. A method of manufacturing high-surface-area silicon powder from silicon dioxide ($SiO_2$) and magnesium (Mg) in a sealable reactor, the silicon powder having surface area equal to or greater than 100 $m^2$/g and a particle size equal to or less than 100 nm, the method comprising the following steps:
    (1) preparing a homogeneous reactant green mixture from silicon dioxide ($SiO_2$) and magnesium (Mg);
    (2) loading the reaction mixture into the sealable reactor;
    (3) filling the reactor with an inert gas and providing optimum inert gas pressure inside the reactor;
    (4) providing initial local heating of the powder mixture and initiating a combustion reaction;
    (5) causing self-sustained reaction under the effect of exothermic heat of the reaction and obtaining a combustion product that comprises silicon and a magnesium oxide phase;
    (6) cooling the combustion product at a rate in the range of 100 K/s to 400 K/s; and
    (7) carrying out post-synthesis treatment of the product that involves leaching in order to completely eliminate the magnesium oxide phase followed by short-term milling.

2. The method of claim 1, wherein silicon dioxide comprises a powder with particle dimensions ranging from 1 to 100 μm and wherein magnesium comprises a powder with particle dimensions ranging from 50 to 200 μm.

3. The method of claim 1, wherein to produce 1 kg of silicon powder, silicon dioxide is used in an amount of about 2146 g, and magnesium is used in an amount of about 868 g.

4. The method of claim 2, wherein to produce 1 kg of silicon powder, silicon dioxide is used in an amount of about 2146 g, and magnesium is used in an amount of about 868 g.

5. The method of claim 1, wherein initial local heating is carried out by locally heating about 1 $mm^3$ of the homogeneous reactant green mixture to the melting point of magnesium.

6. The method of claim 2, wherein initial local heating is carried out by locally heating about 1 $mm^3$ of the homogeneous reactant green mixture to the melting point of magnesium.

7. The method of claim 3, wherein initial local heating is carried out by locally heating about 1 $mm^3$ of the homogeneous reactant green mixture to the melting point of magnesium.

8. The method of claim 1, wherein optimum inert gas pressure inside the reactor ranges from 10 to 20 atm.

9. The method of claim 2, wherein optimum inert gas pressure inside the reactor ranges from 10 to 20 atm.

10. The method of claim 3, wherein optimum inert gas pressure inside the reactor ranges from 10 to 20 atm.

11. The method of claim 1, wherein cooling of the combustion product at a rate ranging from 100 K/s to 400 K/s is carried out directly behind the combustion front.

12. The method of claim 2, wherein cooling of the combustion product at a rate ranging from 100 K/s to 400 K/s is carried out directly behind the combustion front.

13. The method of claim 3, wherein cooling of the combustion product at a rate ranging from 100 K/s to 400 K/s is carried out directly behind the combustion front.

14. The method of claim 1, wherein leaching is carried out by treating the combustion product with 36% hydrochloric acid under normal conditions for 3 hours.

15. The method of claim 14, wherein 36% hydrochloric acid is used in a 1:1 ratio to the magnesium oxide phase.

* * * * *